United States Patent
Stautner et al.

(10) Patent No.: US 12,407,210 B2
(45) Date of Patent: Sep. 2, 2025

(54) HIGH HEAT TRANSFER CRYOGENIC BEARING

(71) Applicant: General Electric Company, Schenectady, NY (US)

(72) Inventors: Ernst Wolfgang Stautner, Niskayuna, NY (US); Constantinos Minas, Slingerlands, NY (US)

(73) Assignee: General Electric Company, Evendale, OH (US)

( * ) Notice: Subject to any disclaimer, the term of this patent is extended or adjusted under 35 U.S.C. 154(b) by 170 days.

(21) Appl. No.: 18/187,366

(22) Filed: Mar. 21, 2023

(65) Prior Publication Data
US 2024/0322638 A1    Sep. 26, 2024

(51) Int. Cl.
| | |
|---|---|
| *H02K 5/173* | (2006.01) |
| *F16C 32/04* | (2006.01) |
| *H02K 9/20* | (2006.01) |
| *H02K 9/22* | (2006.01) |
| *H02K 55/04* | (2006.01) |

(52) U.S. Cl.
CPC ....... *H02K 5/1737* (2013.01); *F16C 32/0438* (2013.01); *H02K 9/20* (2013.01); *H02K 9/225* (2021.01); *H02K 9/227* (2021.01); *H02K 55/04* (2013.01); *F16C 2380/26* (2013.01)

(58) Field of Classification Search
CPC ........ H02K 5/1737; H02K 9/20; H02K 9/225; H02K 9/227; H02K 55/04; F16C 32/0438; F16C 2380/26
See application file for complete search history.

(56) References Cited

U.S. PATENT DOCUMENTS

| | | | |
|---|---|---|---|
| 2,893,703 A | 7/1959 | Richardson | |
| 4,156,342 A | 5/1979 | Korta et al. | |
| 4,289,985 A * | 9/1981 | Popov | H02K 9/20 |
| | | | 310/64 |

(Continued)

FOREIGN PATENT DOCUMENTS

| | | | | |
|---|---|---|---|---|
| CN | 107061496 A | * | 8/2017 | .......... F16C 32/0614 |
| CN | 210183185 U | * | 3/2020 | .......... H02K 5/1732 |

(Continued)

OTHER PUBLICATIONS

English translation of CN-114562512-A (Year: 2022).*

(Continued)

*Primary Examiner* — Tulsidas C Patel
*Assistant Examiner* — Joshua Kiel M Rodriguez
(74) *Attorney, Agent, or Firm* — McCarter & English, LLP

(57) ABSTRACT

A superconducting motor including a rotor, a heat sink, and a bearing. The rotor includes a superconducting winding formed from a superconducting material. The heat sink is positioned within the superconducting motor to absorb heat produced by the superconducting motor. The bearing includes an inner race, an outer race, and a rolling element. The bearing rotatably supports the rotor and is thermally connected to each of the rotor and the heat sink to transfer heat from the rotor to the heat sink. The rolling element is formed from a material having, at 25 K, a thermal conductivity of 20 W/mK or more and an ultimate tensile strength of 650 MPa or more. The rolling element may be formed from a copper alloy.

20 Claims, 6 Drawing Sheets

(56) References Cited

U.S. PATENT DOCUMENTS

| | | | |
|---|---|---|---|
| 6,990,797 B2 | 1/2006 | Venkataramani et al. | |
| 9,784,126 B2 | 10/2017 | Army et al. | |
| 10,598,094 B2 | 3/2020 | Ekanayake et al. | |
| 10,718,233 B2 | 7/2020 | Schwarz et al. | |
| 10,830,096 B2 | 11/2020 | Slavens et al. | |
| 11,515,103 B2 | 11/2022 | Andreyo | |
| 2022/0154723 A1 | 5/2022 | Beers | |
| 2022/0216779 A1* | 7/2022 | Iwakuma | H02K 1/16 |

FOREIGN PATENT DOCUMENTS

| | | | | |
|---|---|---|---|---|
| CN | 114562512 A | * | 5/2022 | F16C 19/16 |
| EP | 2900998 B1 | | 6/2019 | |
| GB | 2548123 A | * | 9/2017 | B64D 27/24 |
| JP | 7126656 B2 | * | 8/2022 | F16C 19/16 |
| KR | 20130078685 A | * | 7/2013 | H02K 9/19 |

OTHER PUBLICATIONS

English translation of JP-7126656-B2 (Year: 2022).*
English translation of KR-20130078685-A (Year: 2013).*
English translation of CN-107061496-A (Year: 2017).*
English translation of CN-210183185-U (Year: 2020).*

Minas, U.S. Appl. No. 18/145,518, filed Dec. 22, 2022 [Available in IFW].

Balachandran et al., "Co-design of an Integrated Direct-drive Electric Motor and Ducted Propeller for Aircraft Propulsion," University of Illinois at Urbana-Champaign, Published by the American Institute of Aeronautics and Astronautics, Inc., AIAA Propulsion and Energy Forum Aug. 24-28, 2020.

Balachandran et al., "Co-Design of Integrated Propeller and Inner Rotor PMSM for Electric Aircraft Application," University of Illinois Urbana-Champaign, 2021 IEEE International Electric Machines & Drives Conference (2021).

Ekin, "Experimental Techniques for Low-Temperature Measurements: Cryostat Design, Material Properties and Superconductor Critical-Current Testing," National Institute of Standards and Technology, Oxford University Press (2006).

Simon et al., "Properties of Copper and Copper Alloys at Cryogenic Temperatures," NIST Monograph 177, United States Department of Commerce Technology Administration, National Institute of Standards and Technology (1992).

"SKF hybrid bearings for extreme application conditions," SKF Group (2016).

Wyatt et al., "High thermal conductivity bearing for rotating devices at liquid helium temperatures," Review of Scientific Instruments, The American Institute of Physics, vol. 45, Issue 3, p. 434-437 (1974).

* cited by examiner

HIGH HEAT TRANSFER CRYOGENIC BEARING

STATEMENT REGARDING FEDERALLY SPONSORED RESEARCH OR DEVELOPMENT

This invention was made with government support under U.S. Government Contract Number 80NNSC19M0125 awarded by the National Aeronautics and Space Administration (NASA). The U.S. Government may have certain rights in this invention.

TECHNICAL FIELD

The present disclosure relates to a bearing for a rotating device, particularly a bearing used in an electric motor.

BACKGROUND

Propulsion systems for commercial aircraft typically include one or more aircraft engines, such as turbofan jet engines. These engines may be powered by aviation turbine fuel, which is typically a combustible hydrocarbon liquid fuel, such as a kerosene-type fuel, having a desired carbon number and carbon-to-hydrogen ratio. Such fuel produces carbon dioxide upon combustion. Using electrical propulsion or hybrid electrical propulsion may reduce or eliminate such carbon dioxide emissions, and such electrical propulsion systems would use an electric motor.

BRIEF DESCRIPTION OF THE DRAWINGS

Features and advantages of the present disclosure will be apparent from the following description of various exemplary aspects, as illustrated in the accompanying drawings, wherein like reference numbers generally indicate identical, functionally similar, and/or structurally similar elements.

DETAILED DESCRIPTION

Figure 1:
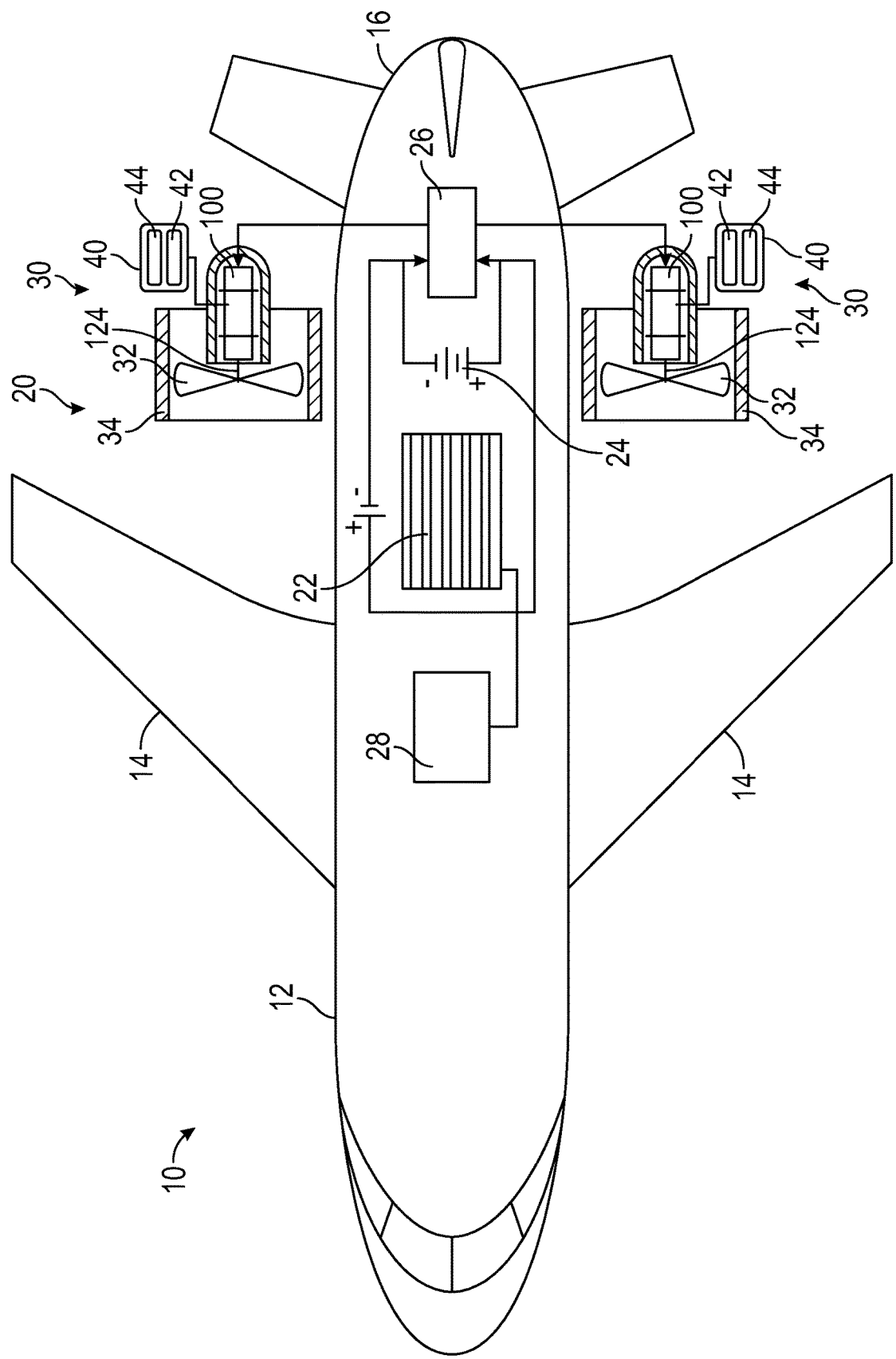
FIG. 1 is a schematic plan view of an aircraft having an electrical propulsion system.

Features, advantages, and aspects of the present disclosure are set forth or apparent from a consideration of the following detailed description, drawings, and claims. Moreover, the following detailed description is exemplary and intended to provide further explanation without limiting the scope of the disclosure as claimed.

Various aspects are discussed in detail below. While specific aspects are discussed, this is done for illustration purposes only. A person skilled in the relevant art will recognize that other components and configurations may be used without departing from the spirit and the scope of the present disclosure.

The terms "forward" and "aft" refer to relative positions within the propulsion system or vehicle (e.g., aircraft), and refer to the normal operational attitude of the propulsion system or vehicle.

The terms "coupled," "fixed," "attached," "connected," and the like, refer to both direct coupling, fixing, attaching, or connecting, as well as, indirect coupling, fixing, attaching, or connecting through one or more intermediate components or features, unless otherwise specified herein.

The singular forms "a," "an," and "the" include plural references unless the context clearly dictates otherwise.

Here and throughout the specification and claims, range limitations are combined and interchanged. Such ranges are identified and include all the sub-ranges contained therein, unless context or language indicates otherwise. For example, all ranges disclosed herein are inclusive of the endpoints, and the endpoints are independently combinable with each other.

As used herein, the terms "axial" and "axially" refer to directions and orientations that extend substantially parallel to the longitudinal centerline of the motor or the rotational axis of the bearing, which in aspects herein are coincident with each other. The terms "radial" and "radially" refer to directions and orientations that extend substantially perpendicular to the longitudinal centerline of the motor or the rotational axis of the bearing. In addition, as used herein, the terms "circumferential" and "circumferentially" refer to directions and orientations that extend arcuately about the longitudinal centerline of the motor or the rotational axis of the bearing.

References to "inner" and "outer" when discussed in the context of radial directions refer to positions relative to the longitudinal centerline of the motor or the rotational axis of the bearing. References to "inner" and "outer" when discussed in the context of axial directions are taken in context of a meridian plane of the component being discussed, such as the bearing. Such meridian planes extend substantially perpendicular to the longitudinal centerline of the motor or the rotational axis of the bearing.

As noted above, aircraft engines may be powered by aviation turbine fuel. Aviation turbine fuel is typically a combustible hydrocarbon liquid fuel that produces carbon dioxide upon combustion. Efforts are being made to reduce the amount of carbon dioxide produced by aircraft. An electric motor may be used in the propulsion system for the aircraft as either part of a hybrid electrical engine propulsion system or even an electrified aircraft. The electric motor may be used to reduce or even to eliminate carbon dioxide emissions from commercial aircraft.

Electric motors dissipate some energy as heat and are thus less than one hundred percent efficient. These energy losses may be caused by, for example, mechanical friction, electrical resistance with the windings, eddy current effects, and hysteresis. One way to improve the efficiency of the electric motor is to use relatively large windings, as such windings have relatively low electrical resistance. However, such large windings are undesirable in aircraft because the larger the winding, the more the electric motor weighs. In aircraft, propulsion systems with a high power to weight ratio are desired, and thus such large electric motors are undesirable.

Another way to increase the efficiency of the electric motor is to use superconducting materials (superconductors) for the windings. An ordinary metallic conductor has some gradual decrease in electrical resistance with a decrease in temperature, but even at temperatures near absolute zero, an ordinary metallic conductor may maintain significant electrical resistance. Superconducting materials, however, have a characteristic critical temperature below which the resistance drops abruptly to zero. An electric motor with windings formed of superconducting materials can thus operate at high efficiencies with relatively small windings, when the electric motor is operated at temperatures below the critical temperature of the superconductor. Superconducting motors that have windings made from superconducting materials and are operated below the critical temperature of the superconductor may thus have power to weight ratios that are desirable for use in aircraft propulsion.

Thermal management of the motor is necessary in order to maintain the motor, and, thus, the windings, below the critical temperature. Critical temperatures for superconductors are in the cryogenic range and, thus, the operating temperature of superconducting motors is preferably kept at temperatures less than fifty kelvin, such as thirty kelvin or less, or such as twenty-five kelvin or less. Even these superconducting electric motors will generate heat as noted above. The superconducting electric motors discussed herein utilize a high heat transfer bearing to transfer heat from the rotor to the stator of the motor where the heat can be removed from the motor by a suitable cooling system. The high heat transfer bearings and bearing assemblies discussed herein thus help to maintain the temperature of the motor at appropriate operating temperatures.

The bearings discussed herein are particularly suitable for use in superconducting electric motors for use in an aircraft. FIG. 1 is a schematic plan view of an aircraft 10 that implements an electric motor with various preferred high heat transfer bearings and bearing assemblies discussed herein. The aircraft 10 includes a fuselage 12, wings 14 attached to the fuselage 12, and an empennage 16. The aircraft 10 also includes a propulsion system 20 that produces a propulsive thrust required to propel the aircraft 10 in flight, during taxiing operations, and the like. The propulsion system 20 includes at least one electric propulsor 30. The electric propulsor 30 includes a motor 100 coupled to a rotating airfoil assembly 32. The motor 100 shown in FIG. 1 is an electric motor and a torque producing system used to produce torque. The motor 100 includes an output shaft 124 that is mechanically coupled to the rotating airfoil assembly 32. The output shaft 124 transmits the torque produced by the motor 100 from the motor 100 to the rotating airfoil assembly 32.

The rotating airfoil assembly 32 includes a plurality of airfoils rotating about a central axis to produce the thrust used to propel the aircraft 10. In the aspect shown in FIG. 1, the rotating airfoil assembly 32 is a fan and the rotating airfoils are fan blades. The fan (rotating airfoil assembly 32) shown in FIG. 1 is a ducted fan with an annular fan casing 34 (or an outer nacelle) provided circumferentially surrounding the fan (rotating airfoil assembly 32) and/or at least a portion of the motor 100. The motor 100 discussed herein, however, may be coupled to other rotating airfoil assemblies such as unducted fans and propellers. Such propellers or fans may be arranged in a pusher configuration, where the rotating airfoil assembly is forward of the motor 100, or a puller configuration, where the rotating airfoil assembly is aft of the motor 100. The motor 100 may be coupled to a plurality of rotating airfoil assemblies, such as a plurality of fans arranged in a contra-rotating arrangement, for example.

The propulsion system 20 for the aircraft 10 shown in FIG. 1 includes a pair of electric propulsors 30 attached to the fuselage 12, such as proximate the empennage 16, one on the port side of the fuselage 12 and one on the starboard side of the fuselage 12. In other aspects, the electric propulsor 30 may have alternative configurations and be coupled to other portions of the aircraft 10. For example, the electric propulsor 30 may additionally or alternatively include one or more aspects coupled to other parts of the aircraft 10, such as, for example, one of the wings 14 by a pylon in an under-wing configuration.

The aircraft 10 shown in FIG. 1 is an electrified aircraft, and the propulsion system 20 includes a source of electricity (an electrical power source). In this aspect, the propulsion system 20 includes a plurality of sources of electricity, a fuel cell stack 22, and a battery 24. Each of the fuel cell stack 22 and the battery 24 is electrically coupled to an electrical bus 26 used to distribute electricity throughout the aircraft 10, including to the motors 100 of the electric propulsors 30. Each of the fuel cell stack 22 and the battery 24 is thus electrically coupled to the motor 100 via the electrical bus 26.

The fuel cell stack 22 may be a hydrogen fuel cell stack, and a fuel tank 28 storing hydrogen, such a diatomic hydrogen, may be fluidly coupled to the fuel cell stack 22 to produce electricity. The fuel tank 28 may be configured to hold the hydrogen fuel at least partially within the liquid phase. To store the hydrogen fuel in the liquid phase, the hydrogen fuel is stored in the fuel tank 28 at very low (cryogenic) temperatures. For example, the hydrogen fuel may be stored in the fuel tank 28 at about −253 degrees Celsius (twenty kelvin) or less at atmospheric pressure, or at other temperatures and pressures to maintain the hydrogen fuel in the liquid phase. In some aspects, the hydrogen fuel may be stored in the fuel tank 28 at temperatures from −259 degrees Celsius (fourteen kelvin) to −243 degrees Celsius (thirty kelvin), and more preferably, from −253 degrees Celsius (twenty kelvin) to −243 degrees Celsius (thirty kelvin). As shown in FIG. 1, at least a portion of the fuel tank 28 is located in the fuselage 12, and, in this aspect, entirely within the fuselage 12.

The electric propulsor 30 may also include a motor control unit 40 (motor controller). The motor control unit 40 is connected to the motor 100 and is configured to operate various aspects of the motor 100, including, in some aspects, regulating an electrical input and a rotational output of the motor 100. In this aspect, the motor control unit 40 is a computing device having one or more processors 42 and one or more memories 44. The processor 42 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 44 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 44 can store information accessible by the processor 42, including computer-readable instructions that can be executed by the processor 42. The instructions can be any set of instructions or a sequence of instructions that, when executed by the processor 42, causes the processor 42 and the motor control unit 40 to perform operations. In some aspects, the instructions can be executed by the processor 42 to cause the processor 42 to complete any of the operations and functions for which the motor control unit 40 is configured, as will be described further below. The instructions can be software written in any suitable programming language, or can be implemented in hardware. Additionally, and/or alternatively, the instructions can be executed in logically and/or virtually separate threads on the processor 42. The memory 44 can further store data that can be accessed by the processor 42.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although the aircraft 10 shown in FIG. 1 is an airplane, the disclosure herein may also be applicable to other aircraft, including, for example, helicopters and unmanned aerial vehicles (UAV). Further, although not depicted herein, in other aspects, the motor 100 may be used in other applications, including, for example, other commercial and industrial motor applications. The motor 100 may thus be connected to drive other mechanical elements (e.g., axles).

Figure 2:
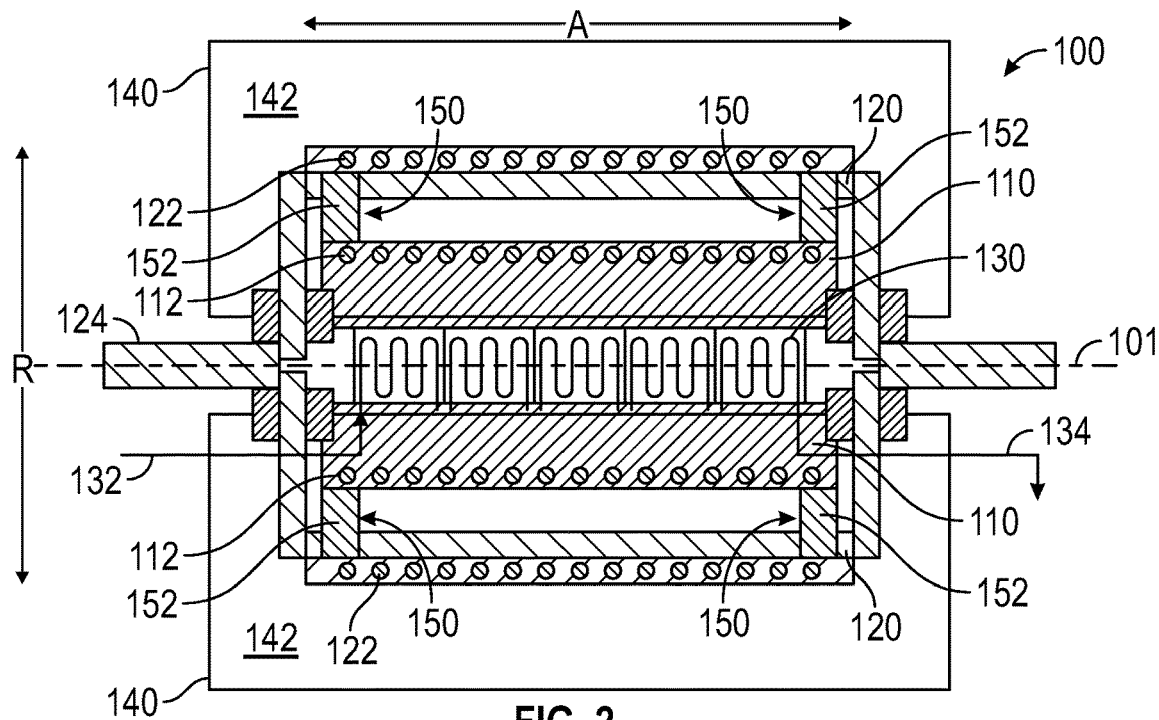
FIG. 2 is a schematic, cross-sectional view of an electric motor of the electrical propulsion system shown in FIG. 1.

FIG. 2 is a schematic, cross-sectional view of one of the motors 100 shown in FIG. 1. The motor 100 includes a stator 110 and a rotor 120 rotatable about a longitudinal axis 101 of the motor 100. The motor 100 includes a radial direction R and an axial direction A. In this aspect, the stator 110 is positioned radially inward of the rotor 120, but in other aspects, the rotor 120 may be positioned radially inward of the stator 110. Each of the stator 110 and the rotor 120 includes windings electrically connected to the electricity source, such as the fuel cell stack 22 or the battery 24, to receive electrical current from the electricity source. One of the windings is an armature winding 112. The armature winding 112 is formed as part of the stator 110 in this aspect. The other winding is a field winding 122, and, in this aspect, the field winding 122 is formed as part of the rotor 120. The output shaft 124 is connected to the rotor 120 and, as electrical current is passed through the windings (the armature winding 112 and the field winding 122), the rotor 120 rotates, producing the torque transmitted by the output shaft 124. As discussed above, the motor 100 is a superconducting motor and the armature winding 112 and the field winding 122 are each formed from a superconducting material. Suitable superconducting materials include, for example, niobium alloys and other niobium compounds, vanadium alloys and other vanadium compounds, magnesium diboride, and cuprates. Examples of such superconducting materials (and others) are listed in Table 1, together with the critical temperature for each material.

TABLE 1

| Superconductor | Critical Temperature (K) |
|---|---|
| Niobium Alloys and Compounds | |
| NbTi | 9.3 |
| $Nb_3Sn$ | 18 |
| $Nb_3Al$ | 18.9 |
| $Nb_3Ga$ | 20.3 |
| $Nb_3(Al_{75}Ge_{25})$ | 20.5 |

TABLE 1-continued

| Superconductor | Critical Temperature (K) |
|---|---|
| $Nb_3Ge$ | 23 |
| NbN | 16 |
| Vanadium Alloys and Compounds | |
| $V_3Ga$ | 15 |
| $V_3Si$ | 16 |
| $V_2(Hf, Zr)$ | 10.1 |
| Cuprates | |
| $La_{1.85}Sr_{0.25}CuO_{4-\delta}$ | 40 |
| $YBa_2Cu_3O_{7-\delta}$ | 90 |
| $Bi_2Sr_2CaCu_2O_{8-\delta}$ | 90 |
| $(Bi, Pb)_2Sr_2CaCu_2O_{8+}$ | 110 |
| $Tl_2Ba_2CaCu_2O_{8+\delta}$ | 110 |
| $Tl_2Ba_2Ca_2Cu_3O_{10-\delta}$ | 125 |
| $HgBa_2Ca_2Cu_3O_{8+\delta}$ | 133 |
| Others | |
| $PbMo_6S_8$ | 15 |
| $MgB_2$ | 39 |

As can be seen in Table 1, these critical temperatures are in the cryogenic range and, thus, the operating temperature of the motor 100 is preferably kept below these temperatures and, more preferably, well below these temperatures to avoid the risk of the windings rising to a temperature where the windings lose their super conductivity. The operating temperature of the motor 100 may be kept at temperatures less than sixty kelvin (60 K), such as fifty kelvin (50 K) or less, such as thirty kelvin (30 K) or less, or such as twenty-five kelvin (25 K) or less. The motor 100 includes a heat sink positioned within the motor 100 to remove heat from the motor 100. In this aspect, the heat sink is a cooling coil 130 thermally coupled to the stator 110. A cooling fluid (coolant) suitable to maintain the motor 100 at the operating temperatures discussed above is passed through the cooling coil 130. Suitable coolants include, for example, liquid hydrogen or liquid helium. For example, the liquid hydrogen used as the fuel for the fuel cell stack 22 may be used as the coolant. The cooling coil 130 includes an inlet 132 fluidly coupled to a coolant source such as the fuel tank 28. The coolant passes through the cooling coil 130 receiving heat from the stator 110 and cooling the stator 110 and then exits the cooling coil 130 via an outlet 134.

To further help maintain the operating temperature of the motor 100, the motor may be operated in a vacuum. The motor 100 thus further includes a vacuum vessel 140 including a cavity 142. The vacuum is drawn in the cavity 142 and the windings (the armature winding 112 and the field winding 122) may be located within the cavity 142.

The rotor 120 is supported relative to the stator 110 by a bearing 152. The bearing 152 is preferably suitable for use in the operating temperatures discussed herein and is thus a cryogenic bearing. Heat may also be generated in the rotor 120. In this aspect, the heat sink (cooling coil 130) is located within the stator 110 and, thus, the heat from the rotor 120 should be transferred from the rotor 120. The rotor 120 is, thus, thermally coupled to the stator 110 by the bearing 152, and the bearing 152 is, thus, preferably a high-heat transfer bearing that efficiently transfers heat from the rotor 120 to the stator 110. In aspects, such as those discussed herein, the bearing 152 may be formed as part of a high-heat transfer bearing assembly 150. In this aspect, the motor 100 includes a plurality of high-heat transfer bearing assemblies 150, each having the bearing 152. In FIG. 2, for example, a high-heat transfer bearing assembly 150 is disposed on each end of the stator 110 and rotor 120. More specifically, a high-heat transfer bearing assembly 150 is disposed on each end of the armature winding 112 and the field winding 122. The aspects of the high-heat transfer bearing assembly 150 and the bearing 152 discussed below are described with reference to one of the high-heat transfer bearing assemblies 150 and bearings 152, but such descriptions apply to the other high-heat transfer bearing assemblies 150 and bearings 152 in the motor 100.

Figure 3:
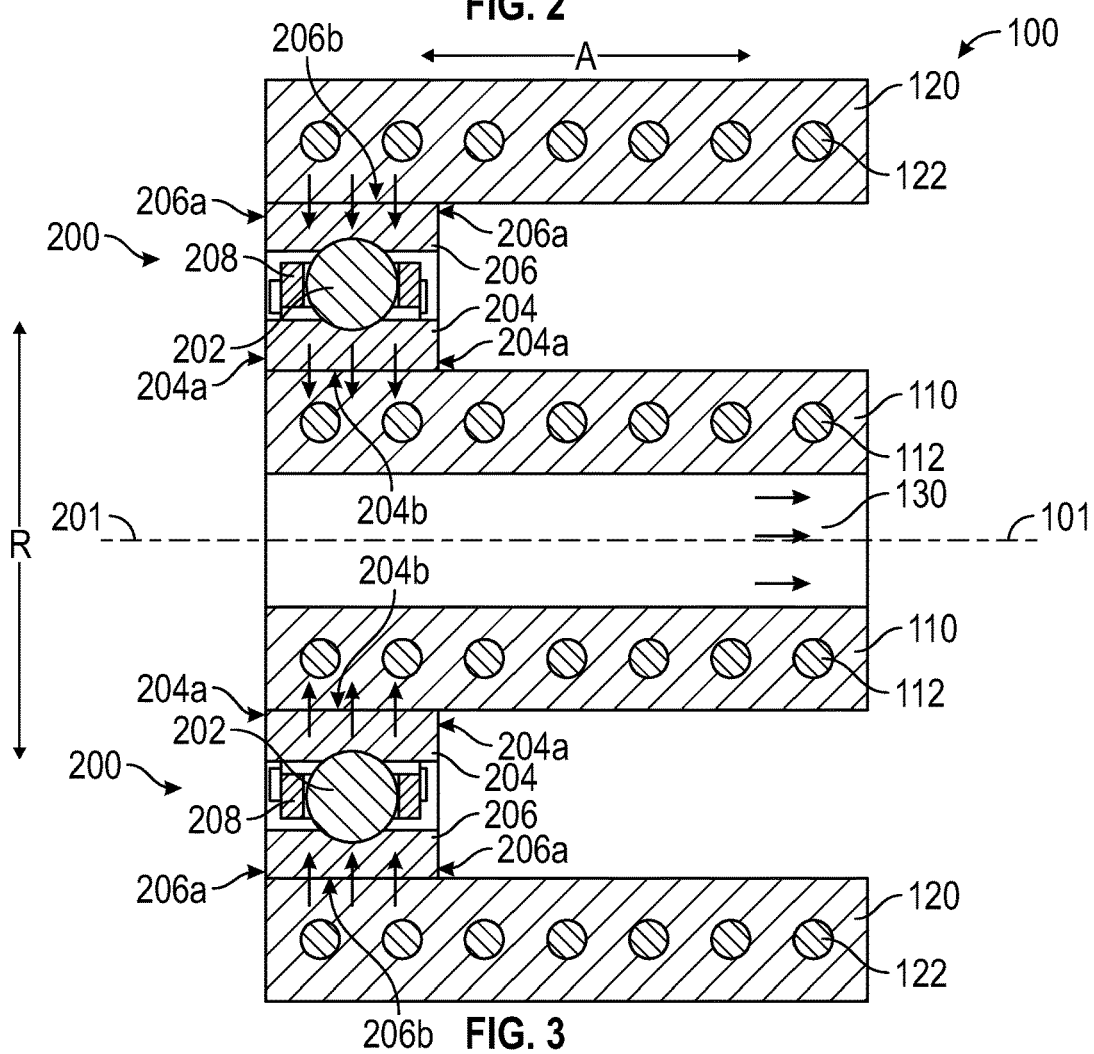
FIG. 3 is a cross-sectional view of a portion of the electric motor having a bearing according to an aspect of the present disclosure.

FIG. 3 is a cross-sectional view of a portion of the motor 100 having a bearing 200 that may be used as a bearing 152 of the motor 100 shown in FIG. 3. The bearing 200 of this aspect is a roller bearing that includes a plurality of rolling elements 202 positioned between an inner race 204 (an inner ring in the aspect shown in FIG. 3) and an outer race 206 (an outer ring in the aspect shown in FIG. 3).

In FIG. 3, the rolling element 202 is a ball, but other suitable rolling elements 202 may be used such as a roller and, more specifically, a cylindrical roller, for example. In some aspects, the rolling elements 202 may be positioned relative to each other by a retainer 208 (also referred to as a cage). The rolling elements 202 are arrayed in a circumferential direction of the bearing 200, and the retainer 208 thus spaces the rolling elements 202 apart from each other in the circumferential direction. The circumferential direction extends in a direction rotating about the rotational axis 201 of the bearing 200, which, in this aspect, is coincident with the longitudinal axis 101 of the motor 100. Each of the inner race 204 and the outer race 206 may have a circumferential groove to guide the rolling elements 202 as the rolling elements 202 rotate in the bearing 200.

In this aspect, the inner race 204 is connected to the stator 110 and the outer race 206 is connected to the rotor 120. As noted above, the bearing 200 is a bearing configured to transfer heat from the rotor 120 to the stator 110, and, thus, the inner race 204 is thermally coupled to the stator 110 and the outer race 206 is thermally coupled to the rotor 120. In this aspect, the inner race 204 is directly thermally coupled to the stator 110, such as by contacting the stator 110, and the outer race 206 is directly thermally coupled to the rotor 120, such as by contacting the 120. The outer race 206 includes two axial surfaces 206a and an outer circumferential surface 206b. The outer circumferential surface 206b of the outer race 206 is directly attached to the rotor 120. Similarly, the inner race 204 includes two axial surfaces 204a and an inner circumferential surface 204b. The inner circumferential surface 204b of the inner race 204 is directly attached to the stator 110.

The field winding 122 and the rotor 120 should have from one to ten watts of cooling to maintain the field winding 122 and the rotor 120 at operating temperatures when the field winding 122 is below its critical temperature, and, thus, superconducting. Stainless steel is a material that may be used for the components of a cryogenic bearing, but the thermal conductivities of bearings made from such materials, however, is not high enough to provide the cooling capacity for the rotor 120. For example, 316 stainless steel has a thermal conductivity of two watts per meter kelvin (2 W/mK) and a thermal resistance of seven hundred fifty kelvin per watt (750 K/W) at twenty-five kelvin (25 K). The bearing 200 of this aspect is formed of materials that have a higher thermal conductivity at cryogenic temperatures.

Preferably, the bearing 200 and, more specifically, the rolling elements 202, the inner race 204, and the outer race 206 are each formed of a material that has a thermal conductivity of that is one or two orders of magnitude higher than stainless steel at twenty-five kelvin (25 K), such as, for example twenty watts per meter kelvin (20 W/mK) or more at twenty-five kelvin (25 K), more preferably a thermal conductivity of one hundred watts per meter kelvin (100 W/mK) or more at twenty-five kelvin (25 K), and even more preferably a thermal conductivity of two hundred watts per meter kelvin (200 W/mK) or more at twenty-five kelvin (25 K). Suitable materials include copper alloys. As used herein, a copper alloy is an alloy where the weight percentage of the copper in the alloy is greater than the weight percentage of any other component of the alloy, based on the total weight of the alloy. As these materials are used in the contact surfaces of the bearing 200, high-strength copper alloys are preferably used. As used herein, high-strength alloys, such as the high-strength copper alloys, are alloys having an ultimate tensile strength of six hundred ninety megapascals (650 MPa) at twenty-five kelvin (25 K). Suitable high-strength copper alloys include, for example, beryllium copper alloys or copper nickel alloys. The bearing 200 is not limited to copper alloys, and other materials, such as other alloys, meeting both strength and thermal conductivity conditions discussed above, may be used. The bearing 200 and, more specifically, the rolling elements 202, the inner race 204, and the outer race 206 thus may each be formed of a material having, at twenty-five kelvin (25 K), both a thermal conductivity of twenty watts per meter kelvin (20 W/mK) or more and an ultimate tensile strength of six hundred ninety megapascals (650 MPa) or more, more preferably both a thermal conductivity of one hundred watts per meter kelvin (100 W/mK) or more and an ultimate tensile strength of six hundred ninety megapascals (650 MPa) or more, and even more preferably both a thermal conductivity of two hundred watts per meter kelvin (200 W/mK) or more and an ultimate tensile strength of six hundred ninety megapascals (650 MPa) or more.

With the bearing 200 and, more specifically, each of the rolling elements 202, the inner race 204, and the outer race 206, formed of the materials discussed above, such as, preferably, the high-strength copper alloys, the bearing 200 thermally couples the rotor 120 to the stator 110 to conduct heat generated in the rotor 120 to the stator 110 and the cooling coil 130 (heat sink) located therein as indicated by the arrows in FIG. 3. In some aspects, each of the rolling elements 202, the inner race 204, and the outer race 206 is formed from a copper alloy having the same primary alloying elements and, preferably, may be formed from the same copper alloy.

Figure 4:
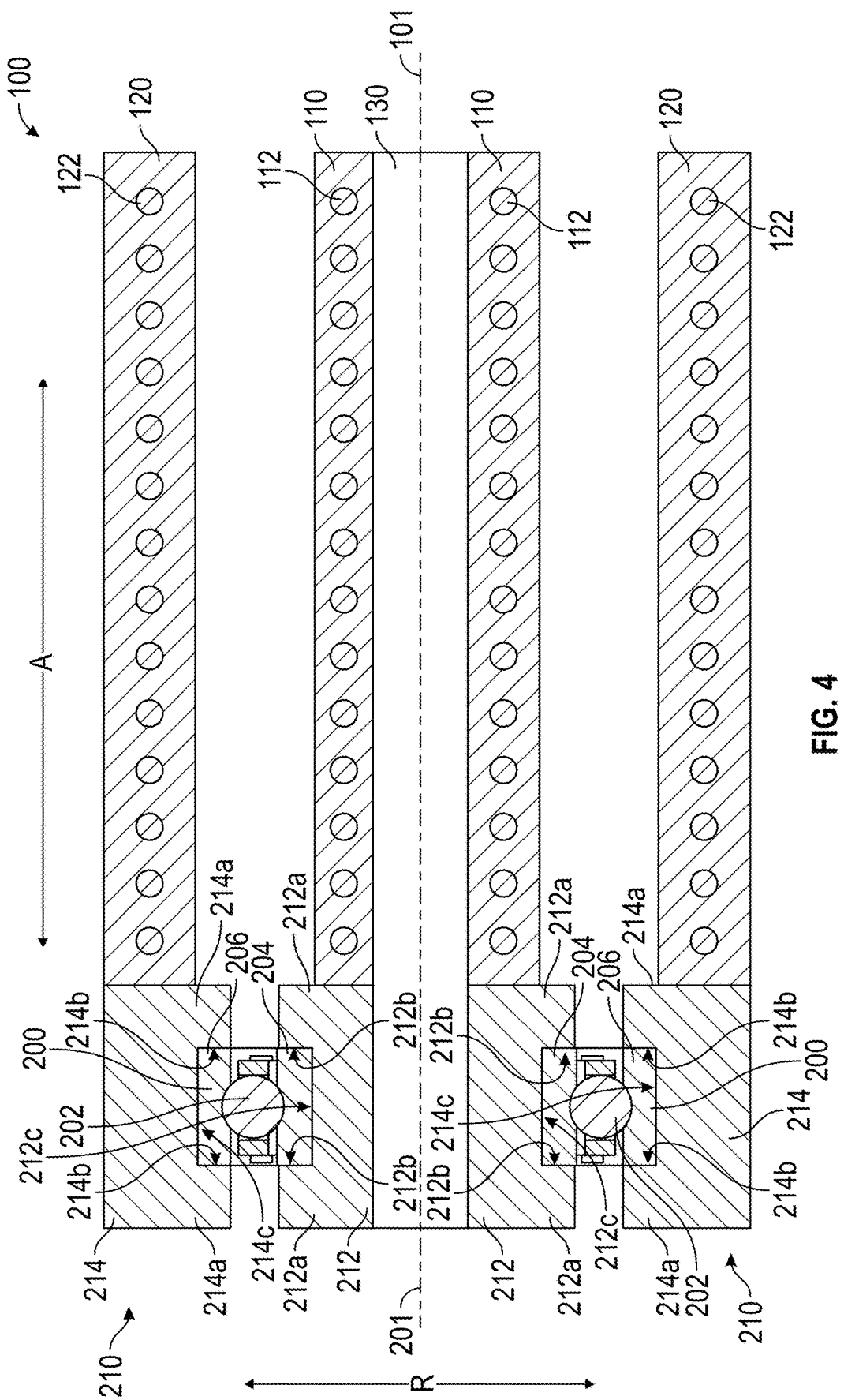
FIG. 4 is a cross-sectional view of a portion of the electric motor having a bearing according to an aspect of the present disclosure.

FIG. 4 is a cross-sectional view of a portion of the motor 100 having a bearing assembly 210 that may be used as the high-heat transfer bearing assembly 150. The bearing assembly 210 of this aspect includes the bearing 200 discussed above with reference to FIG. 3. The description of the bearing 200 and the motor 100 also applies to this aspect, and the same reference numerals will be used for components the bearing 200 and the motor 100 as in the discussion above. A detailed description of these components is omitted here.

In the aspect shown in FIG. 3, the bearing 200 is directly thermally coupled to the stator 110 and the rotor 120. In the applications (e.g., aircraft applications) discussed herein, the stator 110 and the rotor 120 may be made from high-strength, light-weight materials. For example, the superconducting windings, more specifically, the armature winding 112 and the field winding 122 may be embedded in carbon fiber to form the stator 110 and the rotor 120, respectively. Such materials have a relatively low thermal conductivity. To improve the heat transfer from the rotor 120 to the stator 110, the bearing assembly 210 of this aspect (FIG. 4)

includes at least one bearing housing. In this aspect, the bearing 200 is located within a stator bearing housing 212 and a rotor bearing housing 214. The stator bearing housing 212 and the rotor bearing housing 214 may be formed from a high thermal conductivity material such as the copper alloys discussed above for the bearing 200. In some aspects, each of the stator bearing housing 212 and the rotor bearing housing 214 are formed from a copper alloy having the same primary alloying elements as the bearing 200 and, preferably, may be formed from the same copper alloy. The stator bearing housing 212 and the rotor bearing housing 214 may be solid.

The rotor bearing housing 214 is connected to the rotor 120, and, in this aspect, the rotor bearing housing 214 is directly attached to one end of the rotor 120. The rotor bearing housing 214 may be a heat sink for the rotor 120 and, more specifically, the field winding 122. In addition, the rotor bearing housing 214 may have a larger surface area in contact with the bearing 200, providing a larger heat transfer surface for heat to flow from the rotor 120 to the bearing 200 than in the aspect shown in FIG. 3. In the aspect shown in FIG. 4, the rotor bearing housing 214 has a cross-sectional area that is a U-shape with two axial end portions 214a extending radially inward on either axial side of the bearing 200. The bearing 200 is thus located axially between the axial end portions 214a of the rotor bearing housing 214. Each axial end portion 214a includes an inner axial surface 214b facing the bearing 200 and, more specifically, the outer race 206. The axial surfaces 206a (shown in FIG. 3) of the outer race 206 abut the inner axial surfaces 214b of the rotor bearing housing 214. In addition, the rotor bearing housing 214 includes an inner circumferential surface 214c facing the bearing 200 and, more specifically, the outer race 206. The outer circumferential surface 206b (shown in FIG. 3) of the outer race 206 abuts the inner circumferential surface 214c of the rotor bearing housing 214.

The stator bearing housing 212 of this aspect is positioned to oppose the rotor bearing housing 214 with the bearing 200 therebetween. The stator bearing housing 212 is thus radially inward of the bearing 200 and the rotor bearing housing 214 is radially outward of the bearing 200. The stator bearing housing 212 is a mirror image of the rotor bearing housing 214 and includes two axial end portions 212a extending radially inward on either axial side of the bearing 200. The bearing 200 is thus located axially between the axial end portions 212a of the stator bearing housing 212. Each axial end portion 212a includes an inner axial surface 212b facing the bearing 200 and, more specifically, the inner race 204. The axial surfaces 204a (shown in FIG. 3) of the inner race 204 abut the inner axial surfaces 212b of the stator bearing housing 212. In addition, the stator bearing housing 212 includes an outer circumferential surface 212c facing the bearing 200 and, more specifically, the inner race 204. The inner circumferential surface 204b (shown in FIG. 3) of the inner race 204 abuts the outer circumferential surface 212c of the stator bearing housing 212. The stator bearing housing 212 is connected to the stator 110. In this aspect, the stator bearing housing 212 is directly attached to one end of the stator 110. The stator bearing housing 212 thus includes a large surface area for heat transfer from the bearing 200 to receive heat from the field winding 122. In some aspects, the stator bearing housing 212 may be in direct contact with the cooling coil 130 to transfer the heat from the bearing 200 to the cooling coil 130.

Figure 5:
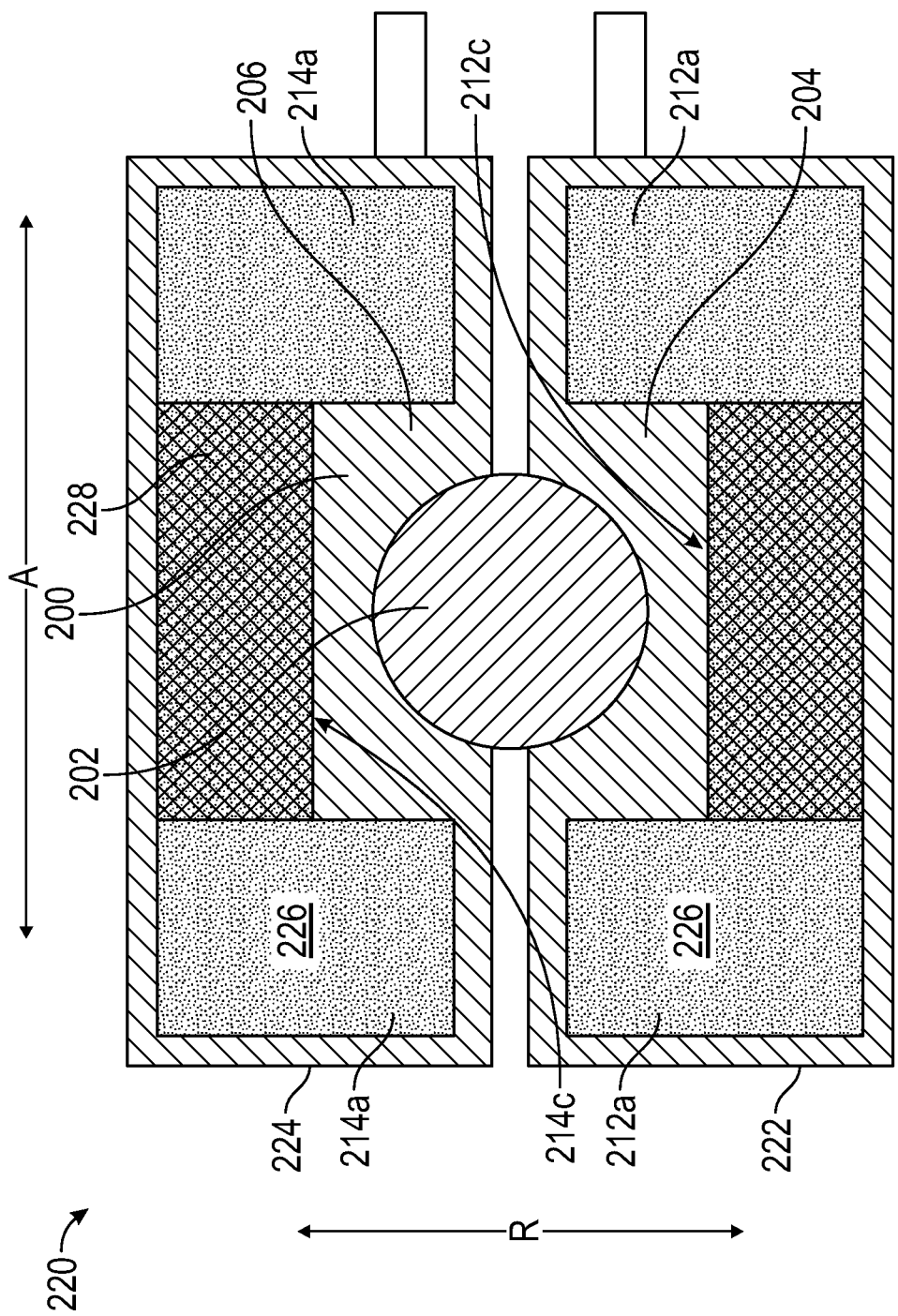
FIG. 5 is a cross-sectional view of a bearing according to an aspect of the present disclosure that may be used in the electric motor.

FIG. 5 is a cross-sectional view of a bearing assembly 220 that may be used as the high-heat transfer bearing assembly 150. The bearing assembly 220 of this aspect includes the bearing 200 discussed above with reference to FIG. 3. The description of the bearing 200 also applies to this aspect, and the same reference numerals will be used for components as in the discussion above. A detailed description of these components is omitted here. The bearing assembly 220 is also similar to the bearing assembly 210 discussed above with reference to FIG. 4. The same reference numerals will be used for components of the bearing assembly 220 of this aspect that are the same as or similar to the components of the bearing assembly 210 discussed above. The description of these components above also applies to this aspect, and a detailed description of these components is omitted here.

The bearing assembly 220 of this aspect also includes a stator bearing housing 222 and a rotor bearing housing 224 that have the same shape and positioning as the stator bearing housing 212 and the rotor bearing housing 214 discussed above. In this aspect, however, each of the stator bearing housing 222 and the rotor bearing housing 224 has a cavity 226 formed therein. The cavity 226 may be filled with a heat transfer fluid suitable for use in the operating temperatures of the motor 100 discussed herein. Suitable heat transfer fluids include, for example, hydrogen or helium. Helium and, more specifically, helium gas may be preferred when the motor 100 operates at the lower end of the operating temperatures discussed herein, such as around twenty kelvin (20 K) or lower such as around ten kelvin (10 K), as temperature fluctuations could cause freezing or so-called slushy hydrogen that would inhibit heat transfer. The heat transfer fluid may thus comprise helium, may consist essentially of helium, or may consist of helium. The use of the heat transfer fluid, such as helium, results in the bearing assembly 220 and, more specifically, the stator bearing housing 222 and the rotor bearing housing 224 of this aspect having a higher heat capacity and thermal conductivity than the solid stator bearing housing 212 and rotor bearing housing 214 discussed above with reference to FIG. 4.

To facilitate heat transfer between the heat transfer fluid and the bearing 200, each of the stator bearing housing 222 and the rotor bearing housing 224 includes a mesh 228 in a central portion of the cavity 226 between the axial end portions 212a, 214a. The mesh 228 is attached to the outer circumferential surface 212c of the stator bearing housing 222 or the inner circumferential surface 214c of the rotor bearing housing 224 to provide conductive heat transfer to the inner race 204 or the outer race 206, respectively. The mesh 228 is thermally coupled to a surface of the rotor bearing housing 224 or the cavity 226 contacting the bearing 200.

Figure 6:
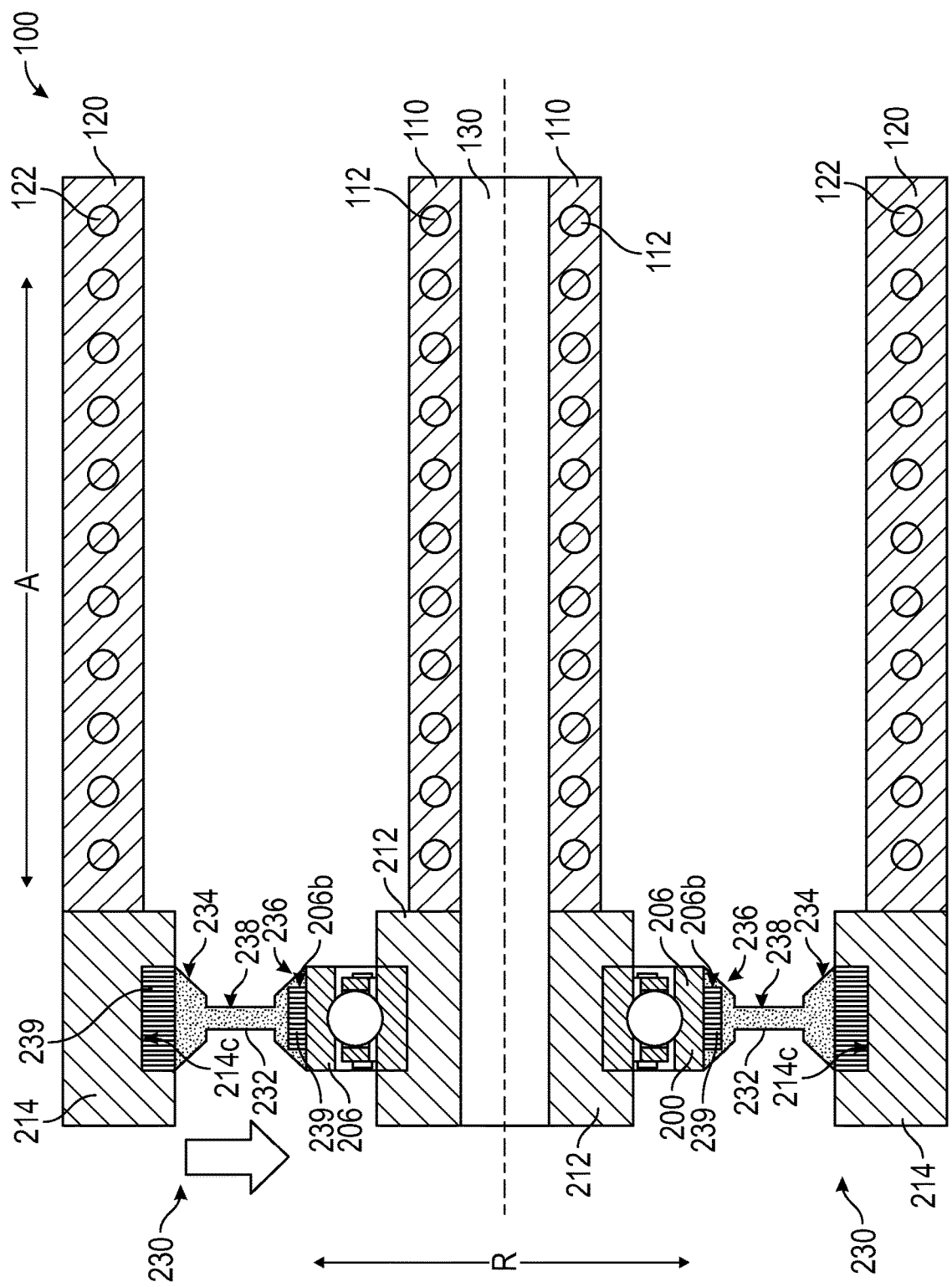
FIG. 6 is a cross-sectional view of a portion of the electric motor having a bearing according to an aspect of the present disclosure.

FIG. 6 is a cross-sectional view of a portion of the motor 100 having a bearing assembly 230 that may be used as the high-heat transfer bearing assembly 150. The bearing assembly 230 of this aspect includes the bearing 200 discussed above with reference to FIG. 3 and the bearing assembly 210, specifically, the stator bearing housing 212 and the rotor bearing housing 214 of the aspect discussed above with reference to FIG. 4. The description of the motor 100, the bearing 200, and the bearing assembly 210 also applies to this aspect, and the same reference numerals will be used for components as in the discussion above. A detailed description of these components is omitted here.

Instead of the bearing 200 being directly thermally connected to the rotor bearing housing 214, a heat pipe 232 is positioned between the rotor bearing housing 214 and the bearing 200 to transfer heat from the rotor bearing housing 214 to the bearing 200. In this aspect, the heat pipe 232 has an outer end 234 and an inner end 236. The outer end 234 is directly attached to the rotor bearing housing 214 and, more specifically, in this aspect, the inner circumferential surface 214c. The inner end 236 is directly attached to the outer race 206 and, more specifically, in this aspect, the outer circumferential surface 206b. The heat pipe 232 includes a heat transfer fluid located therein. The heat transfer fluid may be the heat transfer fluids, such as hydrogen, or preferably helium, discussed above with reference to FIG. 5. The heat transfer fluid is heated at the outer end 234 and absorbs heat from the rotor 120 and, more specifically, the rotor bearing housing 214. Heated heat transfer fluid then flows by natural circulation to the inner end 236 where the heat is transferred to the bearing 200 and, more specifically, the outer race 206. The heat transfer fluid then continues the natural circulation flow back to the outer end 234, where the process is repeated. In this aspect, where the heat pipe 232 is between the bearing 200 and the rotor bearing housing 214, the heat pipe 232 rotates with the rotor 120. The rotation of the heat pipe 232 thus enhances the heat transfer and flow of the heat transfer fluid between the outer end 234 and the inner end 236.

In the aspect shown in FIG. 5, the heat pipe 232 includes features to help facilitate heat transfer to and from the heat transfer fluid within the heat pipe 232. Each of the outer end 234 and the inner end 236 may have a larger cross-sectional area relative to a central section 238 of the heat pipe 232. Additionally, fins 239 may be formed on each of the inner circumferential surface 214c and the outer circumferential surface 206b to further facilitate heat transfer to and from the heat transfer fluid.

Figure 7:
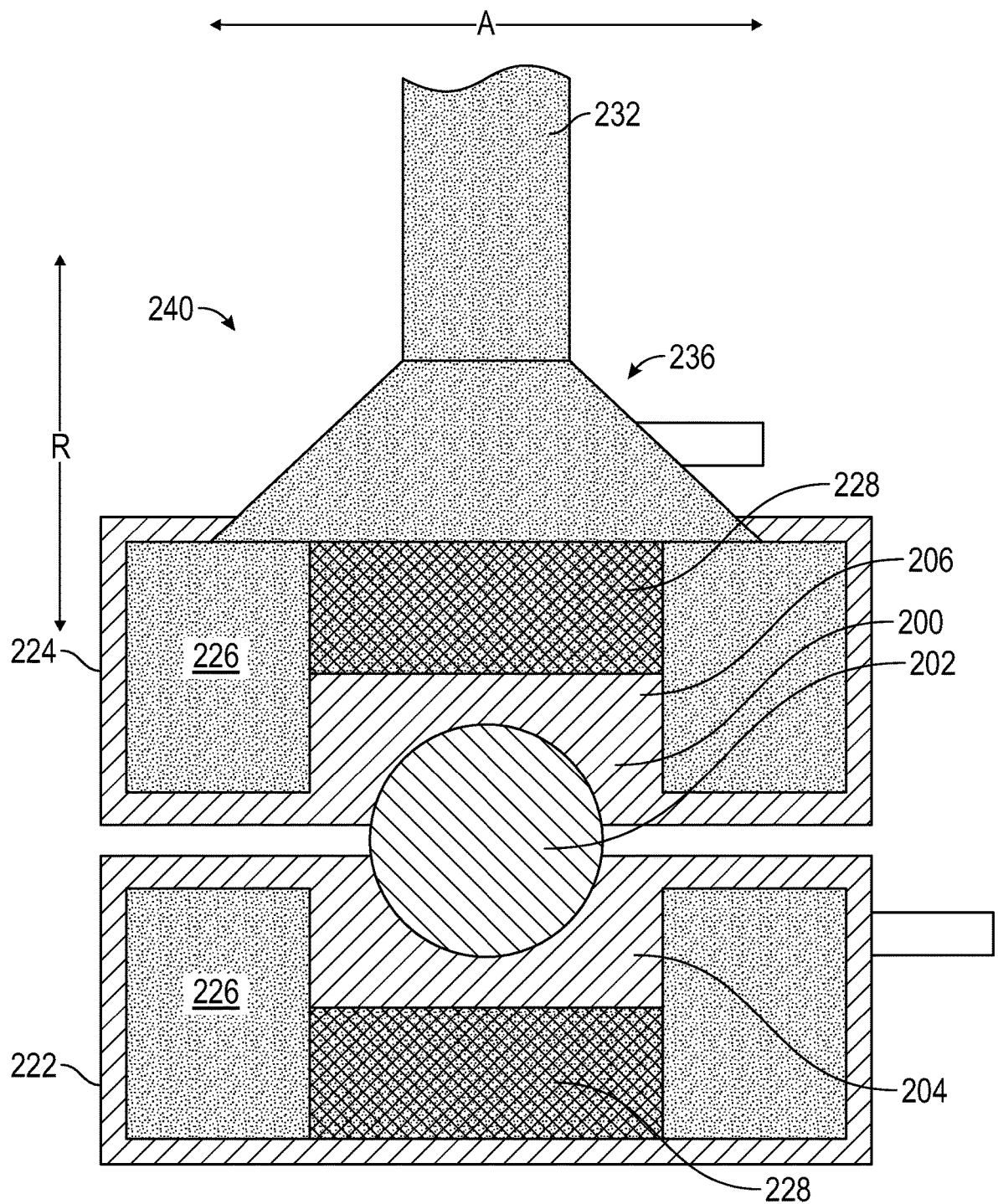
FIG. 7 is a cross-sectional view of a bearing according to an aspect of the present disclosure that may be used in the electric motor.

FIG. 7 is a cross-sectional view of a bearing assembly 240 that may be used as the high-heat transfer bearing assembly 150. The bearing assembly 240 is similar to the bearing assembly 220 discussed above with reference to FIG. 5. The same reference numerals will be used for components of the bearing assembly 220 of this aspect that are the same as or similar to the components of the bearing assembly 220 discussed above. The description of these components above also applies to this aspect, and a detailed description of these components is omitted here. Instead of the rotor bearing housing 224 being directly connected to the rotor 120, the rotor bearing housing 224 of this aspect is thermally connected to the rotor 120 by a heat pipe, such as the heat pipe 232 discussed above with reference to FIG. 6. The discussion of the heat pipe 232 above, also applies to this aspect, and the same reference numerals will be used for components as in the discussion above. A detailed description of the heat pipe 232 is omitted here. The cavity 226 may be fluidly connected to the heat pipe 232 to allow the heat transfer fluid to flow therebetween.

Although described with reference to the motor 100, the bearing 200 and the bearing assemblies 210, 220, 230, and 240 discussed herein may be utilized in other rotating devices, particularly, rotating devices operating at cryogenic temperatures. The bearing 200 and the bearing assemblies 210, 220, 230, and 240 discussed herein can efficiently and effectively transfer heat between from the rotor 120 to the stator 110 of the motor 100 to maintain the windings 112, 122 at appropriate operating temperatures, particularly at cryogenic temperatures used to maintain the windings at a superconducting temperature.

Further aspects of the present disclosure are provided by the subject matter of the following clauses.

A superconducting motor comprises a rotor including a superconducting winding formed from a superconducting material, a heat sink positioned within the superconducting motor to absorb heat produced by the superconducting motor, and a bearing including an inner race, an outer race, and a rolling element, the bearing rotatably supporting the rotor and thermally connected to each of the rotor and the heat sink to transfer heat from the rotor to the heat sink, the rolling element being formed from a material having, at 25 K, a thermal conductivity of 20 W/mK or more and an ultimate tensile strength of 650 MPa or more.

The superconducting motor of the preceding clause, each of the inner race and the outer race being formed from a material having, at 25 K, a thermal conductivity of 20 W/mK or more and an ultimate tensile strength of 650 MPa or more.

The superconducting motor of any preceding clause, the rolling element being formed from a material having, at 25 K, a thermal conductivity of 100 W/mK or more.

The superconducting motor of any preceding clause, the rolling element being a ball.

The superconducting motor of any preceding clause, one of the outer race and the inner race contacts the rotor.

The superconducting motor of any preceding clause, the rolling element being formed from a copper alloy.

The superconducting motor of any preceding clause, each of the inner race and the outer race being formed from a copper alloy.

The superconducting motor of any preceding clause, further comprising a stator, the bearing rotatably supporting the rotor relative to the stator.

The superconducting motor of any preceding clause, the heat sink being located within the stator.

The superconducting motor of any preceding clause, further comprising a bearing assembly including the bearing, a stator bearing housing connected to the stator, and a rotor bearing housing connected to the rotor, the stator bearing housing opposing the rotor bearing housing with the bearing therebetween.

The superconducting motor of any preceding clause, the stator bearing housing being in direct contact with the heat sink to transfer the heat from the bearing to the heat sink.

The superconducting motor of any preceding clause, the heat sink including a cooling coil through which a coolant flows to absorb heat.

The superconducting motor of any preceding clause, the coolant being liquid hydrogen.

The superconducting motor of any preceding clause, further comprising a bearing assembly including the bearing and at least one bearing housing, the bearing being located within the at least one bearing housing.

The superconducting motor of any preceding clause, the at least one bearing housing being a rotor bearing housing connected to the rotor, the bearing being thermally connected to the rotor by the rotor bearing housing.

The superconducting motor of any preceding clause, the at least one bearing housing being formed from a copper alloy.

The superconducting motor of any preceding clause, the at least one bearing housing having a cross-sectional area that is a U-shape with two axial end portions extending in a radial direction on either axial side of the bearing, each axial end portion including an inner axial surface abutting an axial surface of one of the inner race and the outer race.

The superconducting motor of any preceding clause, the at least one bearing housing including a cavity formed therein, the cavity being filled with a heat transfer fluid.

The superconducting motor of any preceding clause, the heat transfer fluid consisting essentially of helium.

The superconducting motor of any preceding clause, the at least one bearing housing including a mesh located within the cavity and thermally coupled to a surface of the at least one bearing housing contacting the bearing.

The superconducting motor of any preceding clause, further comprising a bearing assembly including the bearing and a heat pipe having a heat transfer fluid located therein.

The superconducting motor of any preceding clause, the heat transfer fluid consisting essentially of helium.

The superconducting motor of any preceding clause, the heat pipe being positioned between the rotor and the bearing to transfer heat from the rotor to the bearing.

The superconducting motor of any preceding clause, further comprising a rotor bearing housing connected to the rotor, the heat pipe being thermally connected to the rotor by the rotor bearing housing.

The superconducting motor of any preceding clause, the rotor bearing housing being formed from a copper alloy.

Although the foregoing description is directed to the preferred aspects, other variations and modifications will be apparent to those skilled in the art and may be made without departing from the spirit or the scope of the disclosure. Moreover, features described in connection with one aspect may be used in conjunction with other aspects, even if not explicitly stated above.

The invention claimed is:

1. A superconducting motor comprising:
   a rotor including a superconducting winding formed from a superconducting material;
   a stator including a heat sink positioned within the stator to absorb heat produced by the superconducting motor; and
   a bearing including an inner race, an outer race, and a rolling element, the bearing rotatably supporting the rotor relative to the stator, the bearing thermally connected to each of the rotor and the heat sink to transfer heat from the rotor to the heat sink located within the stator, the rolling element being formed from a material having, at 25 K, a thermal conductivity of 20 W/mK or more and an ultimate tensile strength of 650 MPa or more.

2. The superconducting motor of claim 1, wherein each of the inner race and the outer race is formed from a material having, at 25 K, a thermal conductivity of 20 W/mK or more and an ultimate tensile strength of 650 MPa or more.

3. The superconducting motor of claim 1, wherein the rolling element is formed from a material having, at 25 K, a thermal conductivity of 100 W/mK or more.

4. The superconducting motor of claim 1, wherein one of the outer race or the inner race contacts the rotor.

5. The superconducting motor of claim 1, wherein the heat sink includes a cooling coil through which a coolant flows to absorb heat.

6. The superconducting motor of claim 1, wherein the rolling element is formed from a copper alloy.

7. The superconducting motor of claim 1, wherein each of the inner race and the outer race is formed from a copper alloy.

8. The superconducting motor of claim 1, further comprising a bearing assembly including the bearing, a stator bearing housing connected to the stator, and a rotor bearing housing connected to the rotor, the stator bearing housing opposing the rotor bearing housing with the bearing therebetween.

9. The superconducting motor of claim 8, wherein the stator bearing housing is in direct contact with the heat sink to transfer the heat from the bearing to the heat sink.

10. The superconducting motor of claim 1, further comprising a bearing assembly including the bearing and at least one bearing housing, the bearing being located within the at least one bearing housing.

11. The superconducting motor of claim 10, wherein the at least one bearing housing is a rotor bearing housing connected to the rotor, the bearing being thermally connected to the rotor by the rotor bearing housing.

12. The superconducting motor of claim 10, wherein the at least one bearing housing is formed from a copper alloy.

13. The superconducting motor of claim 10, wherein the at least one bearing housing includes a cavity formed therein, the cavity being filled with a heat transfer fluid.

14. The superconducting motor of claim 13, wherein the heat transfer fluid consists essentially of helium.

15. The superconducting motor of claim 13, wherein the at least one bearing housing includes a mesh located within the cavity and thermally coupled to a surface of the at least one bearing housing contacting the bearing.

16. The superconducting motor of claim 10, wherein the at least one bearing housing has a cross-sectional area that is a U-shape with two axial end portions extending in a radial direction on either axial side of the bearing, each axial end portion including an inner axial surface abutting an axial surface of one of the inner race and the outer race.

17. The superconducting motor of claim 1, further comprising a bearing assembly including the bearing and a heat pipe having a heat transfer fluid located therein.

18. The superconducting motor of claim 17, wherein the heat transfer fluid consists essentially of helium.

19. The superconducting motor of claim 17, wherein the heat pipe is positioned between the rotor and the bearing to rotate with the rotor and transfer heat from the rotor to the bearing.

20. The superconducting motor of claim 17, wherein the heat pipe includes an outer end, an inner end, and a central section, one or both of the outer end and the inner end having a larger cross-sectional area than a cross-sectional area to of the central section.

* * * * *